(12) United States Patent
Tsai (10) Patent No.: US 7,472,518 B2
(45) Date of Patent: *Jan. 6, 2009

(54) ANTI-SHOCK DEVICE

(76) Inventor: Chong-Shien Tsai, 6F-2, No. 5, Lane 466, Minchuan Rd., North Dist., Taichung (TW)

( * ) Notice: Subject to any disclaimer, the term of this patent is extended or adjusted under 35 U.S.C. 154(b) by 326 days.

This patent is subject to a terminal disclaimer.

(21) Appl. No.: 11/293,297

(22) Filed: Dec. 5, 2005

(65) Prior Publication Data

US 2007/0125930 A1   Jun. 7, 2007

(51) Int. Cl.
*E04B 1/98* (2006.01)
*E04H 9/02* (2006.01)

(52) U.S. Cl. .................... 52/167.6; 248/562; 248/569; 52/167.1; 52/167.4; 52/167.5; 267/136; 267/140.11; 267/140.5

(58) Field of Classification Search ................ 248/562, 248/569; 52/167.1, 167.4, 167.5, 167.6; 267/136, 140.11, 140.5
See application file for complete search history.

(56) References Cited

U.S. PATENT DOCUMENTS

| 1,945,595 | A | * | 2/1934 | Chilton | 267/269 |
| 4,133,157 | A | * | 1/1979 | Bschorr et al. | 248/638 |
| 6,085,473 | A | * | 7/2000 | Teramachi et al. | 52/167.5 |
| 6,164,022 | A | * | 12/2000 | Ishikawa et al. | 52/167.5 |
| 6,725,612 | B2 | * | 4/2004 | Kim | 52/167.5 |
| 6,862,849 | B2 | * | 3/2005 | Kim | 52/167.9 |
| 6,951,083 | B2 | * | 10/2005 | Kim | 52/167.9 |
| 7,237,364 | B2 | * | 7/2007 | Tsai | 52/167.6 |
| 2006/0125161 | A1 | * | 6/2006 | Tsai | 267/136 |
| 2007/0130848 | A1 | * | 6/2007 | Tsai | 52/167.7 |

FOREIGN PATENT DOCUMENTS

| JP | 06212833 A | * | 8/1994 |
| JP | 2001227196 A | * | 8/2001 |

* cited by examiner

*Primary Examiner*—J. Allen Shriver
*Assistant Examiner*—Nkeisha J Dumas
(74) *Attorney, Agent, or Firm*—Rosenberg, Klein & Lee (57) ABSTRACT

An anti-shock device has at least two sliding members placed in at least two layers. Each sliding member is comprised of a slotted seat, an inner seat, and a rolling shaft. The slotted seat has a slot defined longitudinally in a face and has outer curved rails defined in two sidewalls. The inner seat mounted slidably in the slot has an inner curved rail defined therein, corresponding to and curving in the opposite direction of the outer curved rails. The rolling shaft is mounted rotatably through the outer curved rails and the inner curved rail. When subjected to vibration, the anti-shock device converts the horizontal forces into vertical forces. In addition, an energy dissipation member is provided in the anti-shock device that eliminates vertical vibrations.

28 Claims, 10 Drawing Sheets

ANTI-SHOCK DEVICE

BACKGROUND OF THE INVENTION

1. Field of the Invention

The present invention relates to an anti-shock device, and particularly relates to an anti-shock device that is small in size and can eliminate shock in the vertical and horizontal axes.

2. Description of the Related Art

As land in modern cities becomes more limited, buildings are being built taller and taller to provide more accommodation. Skyscrapers have even become an important index of a city's development.

However, skyscrapers are faced with potential dangers, for example, earthquakes. The United States, Taiwan and Japan are located on a seismic zone and suffer frequent earthquakes, so it is especially vital to have an anti-shock device to protect skyscrapers in these countries.

In addition, historical cultural relics, important instruments in hospitals, rescue centers, electronic elements and precision machinery also need to be protected by anti-shock devices.

In general, there are two methods that are applied in anti-shock devices; one is isolating vibration transmission and the other is absorbing vibration energy. A conventional anti-shock device is comprised of a top seat, a base seat and a swiveling mechanism mounted between the top seat and the base seat. The top seat is mounted at the bottom of a skyscraper or machine, the base seat is mounted on the ground. When the vibration is transferred to the anti-shock device, the top seat will have a displacement with the bottom seat due to the swiveling mechanism, whereby the vibration is reduced or eliminated. Nevertheless, the conventional anti-shock device can only reduce the horizontal vibration, but is of no use for vertical vibration. Another conventional anti-shock device is comprised of a seat and an inner member, which have a relative movement to each other when they receive vibrations, so the device is capable of eliminating vibrations in both the horizontal and vertical axes. A curved rail is defined in the seat or in the inner member, so it is necessary to have a long curved rail to increase vibration elimination capacity, but the entire device would be too large to be packaged conveniently.

Therefore, the invention provides an anti-shock device to mitigate or obviate the aforementioned problems.

SUMMARY OF THE INVENTION

The main objective of the present invention is to provide an anti-shock device that can eliminate vibrations in both the vertical and horizontal axes caused by earthquake, and the size of the anti-shock device is reduced compared with the prior art.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
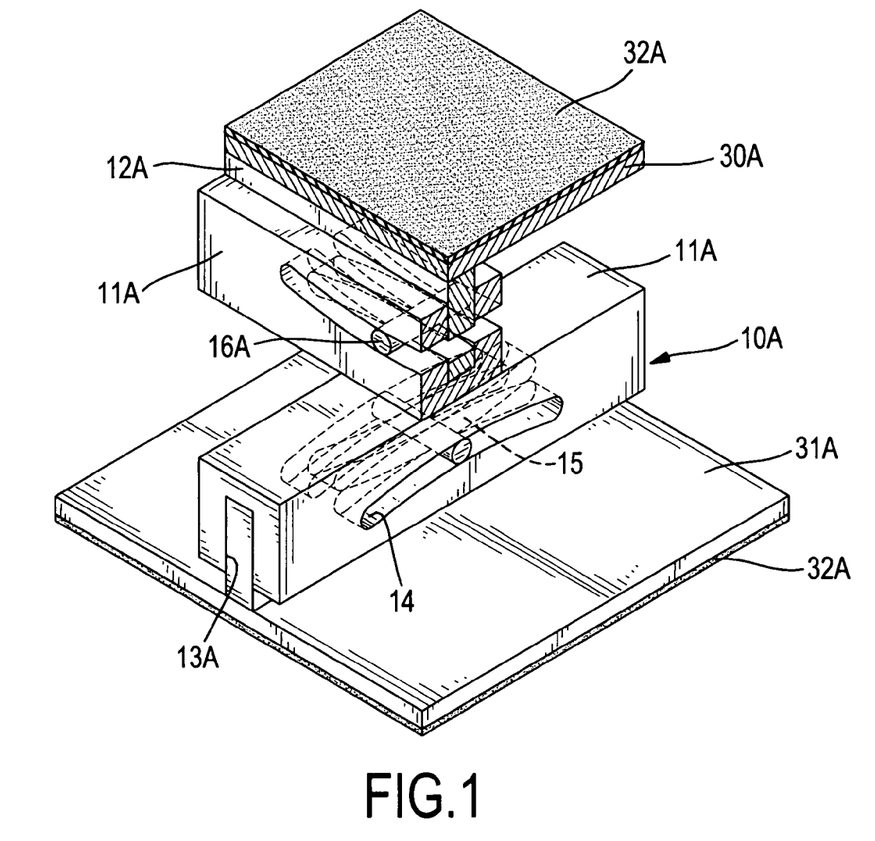
FIG. 1 is a perspective view in partial section of a first embodiment of an anti-shock device in accordance with this invention.

With reference to FIG. 1, an anti-shock device has two sliding members (10A) mounted orthogonally or including a certain angle. Each sliding member (10A) has a slotted seat (11A), an inner seat (12A) and a rolling shaft (16A).

The slotted seat (11A) has a slot (13A) defined longitudinally in a bottom face or a top face, and two outer curved rails (14) are defined longitudinally in opposite sidewalls of the slotted seat (11A), and curve toward the opening of the slot (13A).

The inner seat (12A) is a block with a rectangular cross section mounted slidably in the slot (13A) of the slotted seat (11A), with part of the inner seat (12A) extending out of the slotted seat (11A). An inner curved rail (15) is defined in the inner seat (12A) corresponding to the outer curved rails (14) and curves in the opposite direction away from the opening of the slot (13A).

The rolling shaft (16A) is mounted rotatably through the outer curved rails (14) and the inner curved rail (15).

With reference to FIG. 1, the two sliding members (10A) contact each other orthogonally on non-slot or non-rail faces, that is, when one sliding member (10A) is mounted over the other sliding member (10A), the lower sliding member (10A) is turned over such that the slotted seat (11A) of the lower sliding member (10A) contacts the slotted seat (11A) of the upper sliding member (10A).

A top plate (30A) is mounted on the inner seat (12A) of the upper sliding member (10A), and a bottom plate (31A) is mounted below the inner seat (12A) of the lower sliding member (10A). The top plate (30A) and the bottom plate (31A) are both covered with a dampening layer (32A) made of an energy dissipation material, or only one of the plates is covered with the dampening layer (32A).

Objects to be protected can be placed on the top plate (30A) directly or indirectly, and the bottom plate (31A) is fastened to the ground, floor or some foundation directly or indirectly. When subjected to a horizontal vibration, the forces can be dissipated by the two sliding members (10A). The rolling shaft (16A) and the slotted seat (11A) will have a relative displacement. As the rolling shaft (16A) moves slightly relative to the ground, the slotted seat (11A) has to be moved in the vertical axis to accommodate the rolling shaft (16A), therefore, the horizontal forces are converted to a vertical force on the slotted seat (11A). As the slotted seat (11A) and the inner seat (12A) have oppositely curved rails, a same displacement can convert a greater magnitude of horizontal forces than the prior art, so the size of the device can be reduced. The dampening layer (32A) dissipates the vertical vibration.

Figure 2:
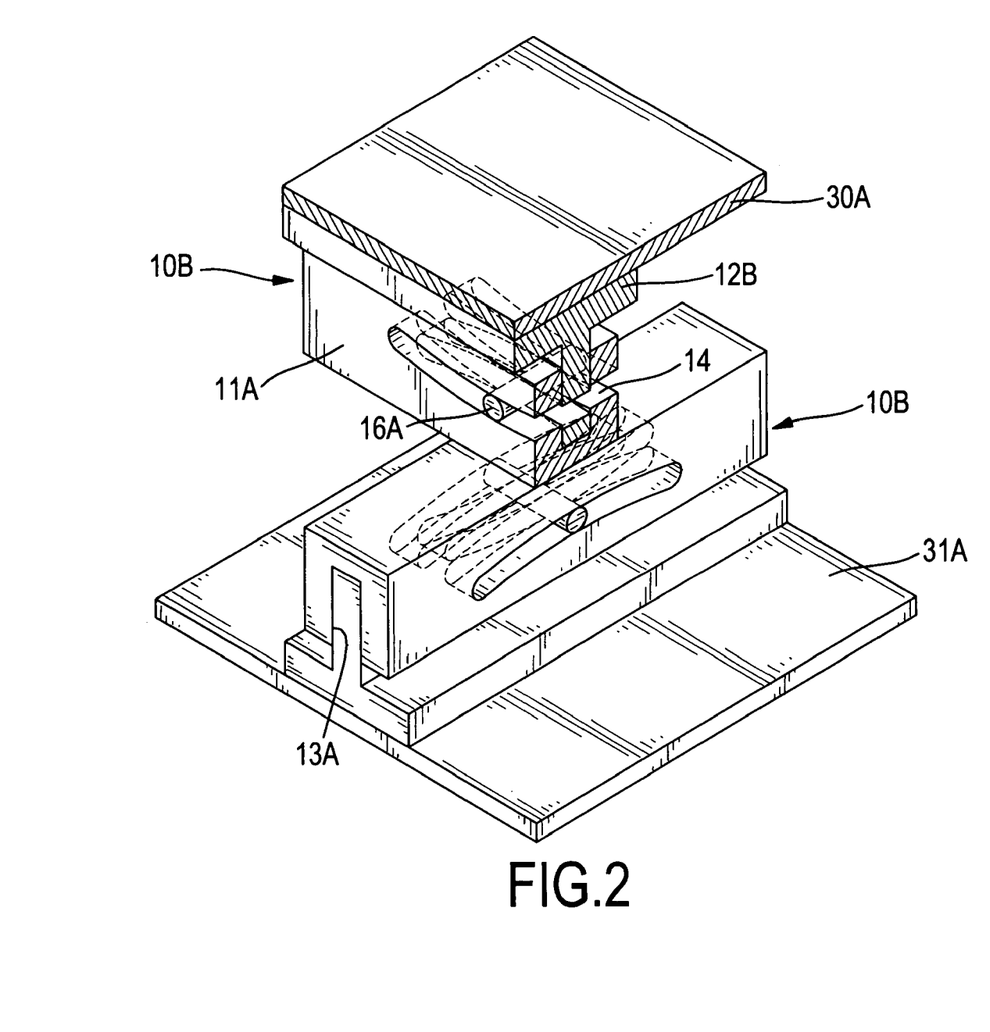
FIG. 2 is a perspective view in partial section of a second embodiment of the anti-shock device in accordance with this invention.

With reference to FIG. 2, in a second embodiment of the anti-shock device, the inner seat (12A) in the first embodiment is a T-shaped seat (12B) having a protrusion in a middle that is mounted slidably in the slot (13A) of the sliding member (10B).

Figure 3:
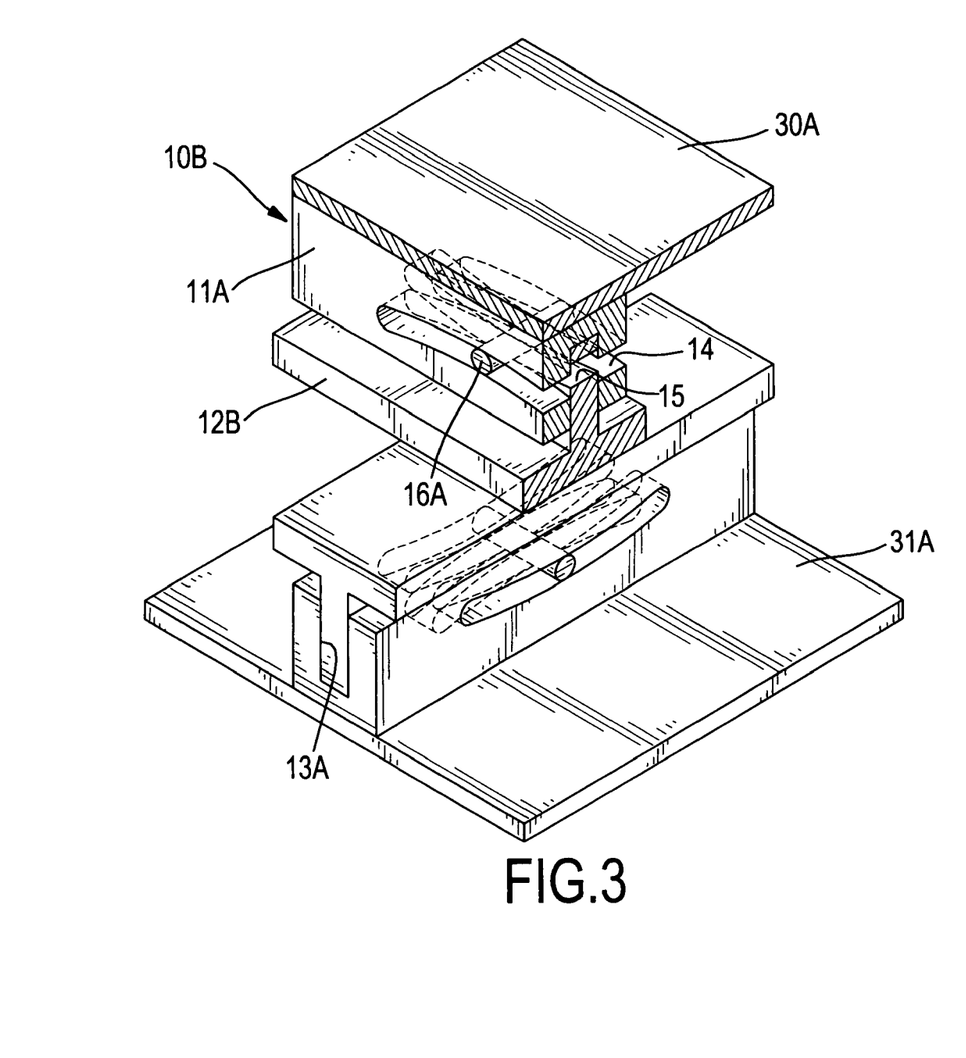
FIG. 3 is a perspective view in partial section of a third embodiment of the anti-shock device in accordance with this invention.

With reference to FIG. 3, each sliding member (10B) in the second embodiment is turned over, that is, two T-shaped seats (12B) mounted in two sliding members (10B) contact each other. The slotted seat (11A) in the upper sliding member (10B) is covered with the top plate (30A), and the slotted seat (11A) in the lower sliding member (10B) has a bottom plate (31A) mounted below. The bottom plate (31A) is fastened to the ground, floor or some foundation as in the first and second embodiments.

FIGS. 4-7 show different applications of an energy dissipation member (20).

Figure 4:
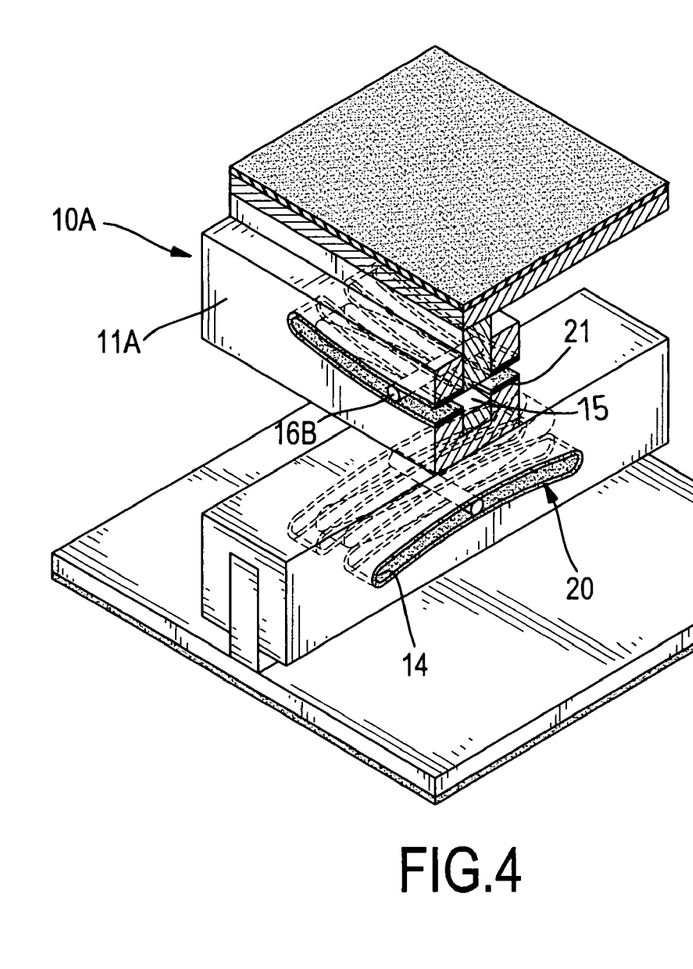
FIG. 4 is a perspective view in partial section of a fourth embodiment of the anti-shock device in accordance with this invention.

With reference to FIG. 4, the rolling shaft (16A) in the first embodiment is replaced by a rolling shaft (16B) that has a smaller diameter than the rolling shaft (16A). In this embodiment, the energy dissipation member (20) is a dampening layer (21) covering inner walls of the outer curved rails (14). In addition, the dampening layer (21) can also cover inner walls of the inner curved rails (15).

Figure 5:
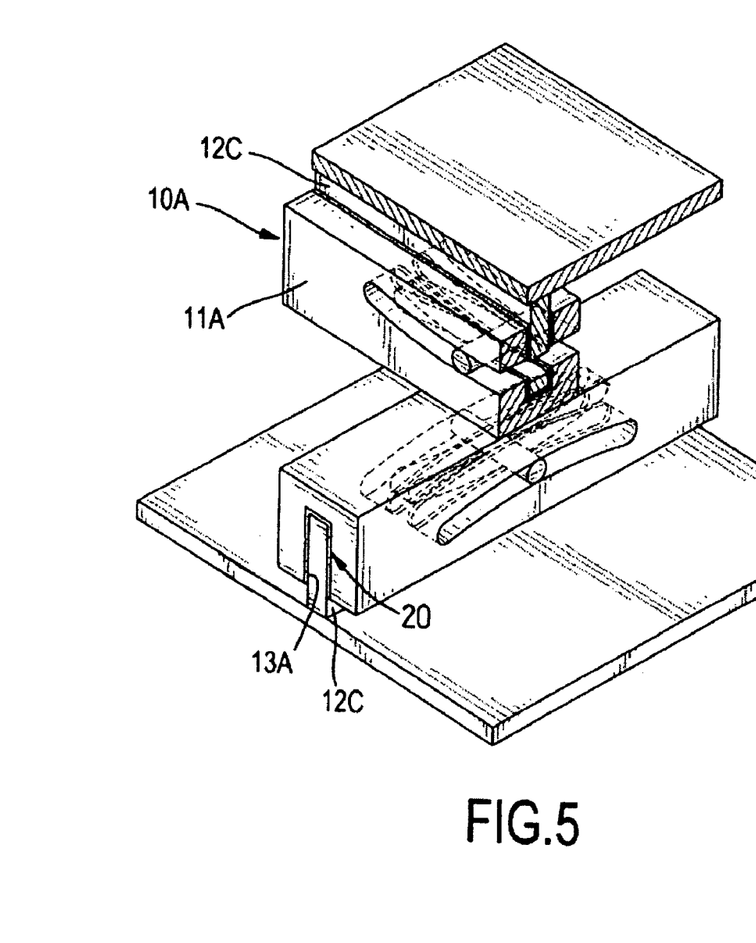
FIG. 5 is a perspective view in partial section of a fifth embodiment of the anti-shock device in accordance with this invention.

With reference to FIG. 5, the inner seat (12A) is replaced by an inner seat (12C) that is thinner than the inner seat (12A), so the dampening layer (21) is filled in a space between the inner seat (12C) and an inner wall of the slot (13A).

Figure 6:
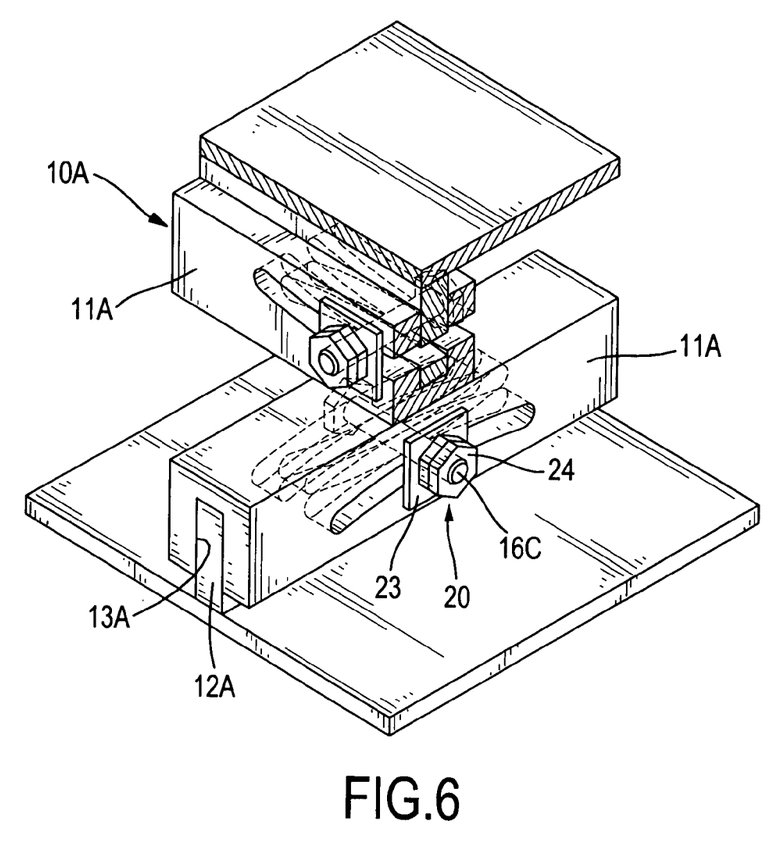
FIG. 6 is a perspective view in partial section of a sixth embodiment of the anti-shock device in accordance with this invention.

With reference to FIG. 6, in a sixth embodiment of the anti-shock device, the rolling shaft (16A) in the first embodiment is replaced by a rolling shaft (16C) that is longer than the rolling shaft (16A), so two ends of the rolling shaft (16C) extend out of sidewalls of the slotted seat (11A). The energy dissipation member (20) is a pad (23) mounted at two ends of the rolling shaft (16C), that is, the two ends of the rolling shaft (16C) are threaded and penetrate through the pads (23), and are fastened by nuts (24), so the two pads (23) contact two sides of the slotted seat (11A). Or alternatively, the two pads (23) are mounted between the slotted seat (11A) and the inner seat (12A), respectively, and the rolling shaft (16C) extends through the two pads (23). Of course, only mounting one pad is also applicable.

Figure 7:
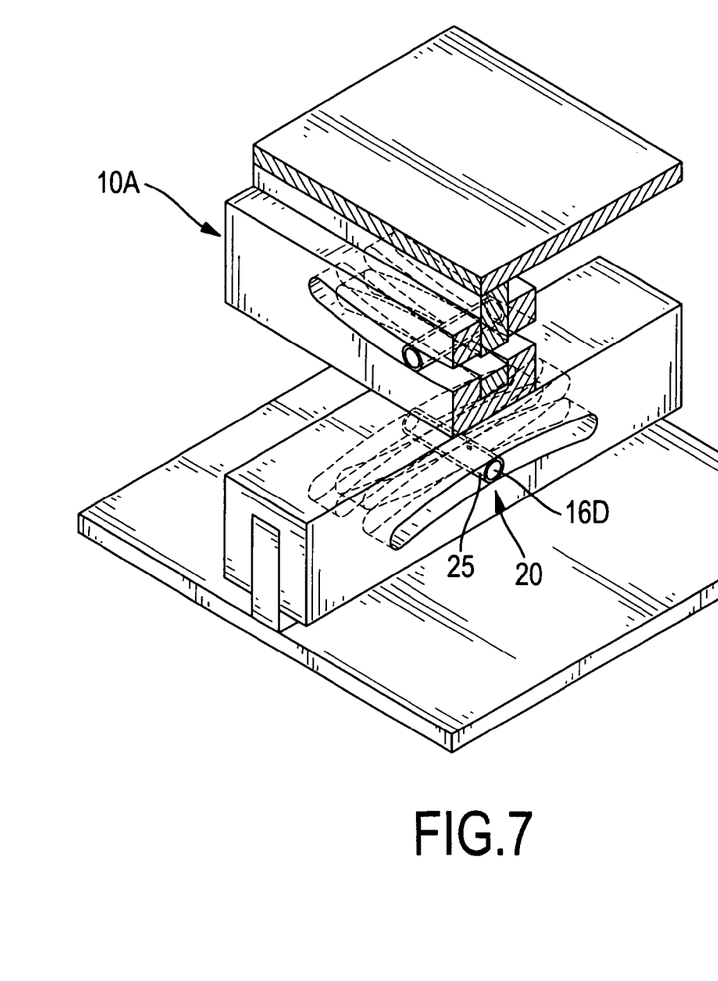
FIG. 7 is a perspective view in partial section of a seventh embodiment of the anti-shock device in accordance with this invention.

With reference to FIG. 7, the rolling shaft (16A) in the first embodiment is replaced by a rolling shaft (16D) having a smaller diameter. The energy dissipation member (20) is a dampening layer (25) covering an outer surface of the rolling shaft (16D).

The energy dissipation member (20) can also be applied on the rolling shaft (16A) in the first, second and third embodiments, which are similar to the fourth to seventh embodiments, so the description has been omitted.

Figure 8:
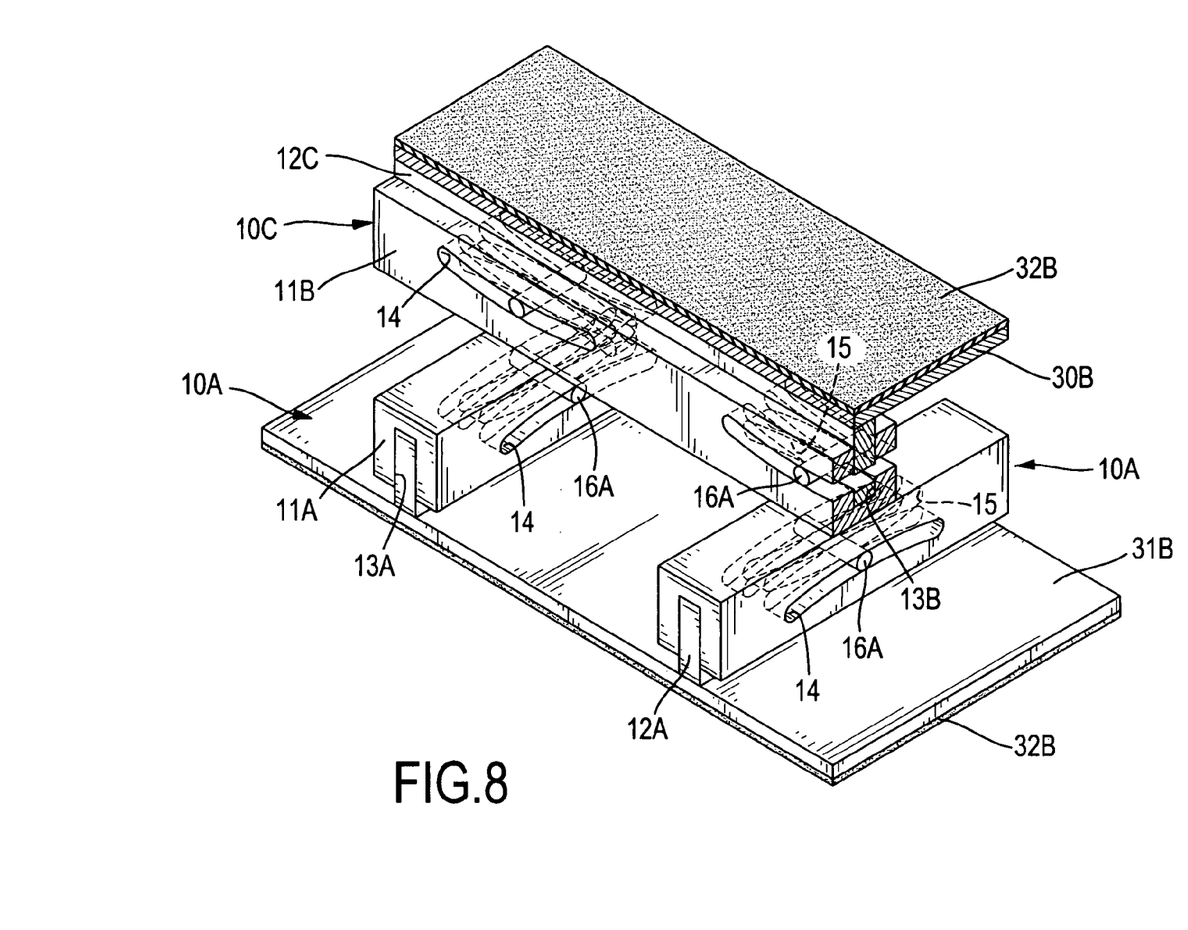
FIG. 8 is a perspective view in partial section of an eighth embodiment of the anti-shock device in accordance with this invention.

With reference to FIG. 8, an eighth embodiment of the anti-shock device is comprised of three sliding members, and one of the three sliding members is a modified sliding member (10C). The modified sliding member (10C) is placed over the two sliding members (10A), and the modified sliding member (10C) contacts the two sliding members (10A) orthogonally on non-slot or non-rail faces. The two sliding members (10A) are the same as in the first embodiment and placed in parallel. The modified sliding member (10C) has a slotted seat (11B), an inner seat (12C), at least one rolling shaft (16A). In the eighth embodiment, two rolling shafts (16A) are provided. The slotted seat (11B) has a slot (13B) defined longitudinally in a top face or a bottom face. Two sets of outer curved rails (14) are defined in opposite sidewalls of the slotted seat (11B), and curve toward the opening of the slot (13B).

The inner seat (12C) is mounted slidably in the slot (13B) of the slotted seat (11B). The inner curved rail (15) is defined in the inner seat (12C) corresponding to the outer curved rails (14) and curves in the opposite direction away from the opening of the slot (13B). The rolling shaft (16A) is mounted through the outer curved rails (14) and the inner curved rail (15).

A top plate (30B) is mounted on the inner seat (12C) of the modified sliding member (10C), and a bottom plate (31B) is mounted below the inner seats (12A) of the two sliding members (10A). The dampening layer (32B) is mounted on the top plate (30B) as well as below the bottom plate (31B).

In the eighth embodiment, the two sliding members (10A) can also be replaced by two modified sliding members (10C).

It is also applicable that the two sliding members (10A) can be turned over, with the two inner seats (12A) contacting the modified sliding member (12C), or the modified sliding member is turned over, too. In addition, the inner seats (12C), (12A) can also be replaced by the T-shaped seat (12B) in the second embodiment.

The energy dissipation member (20) is also applicable in the eighth embodiment.

Figure 9:
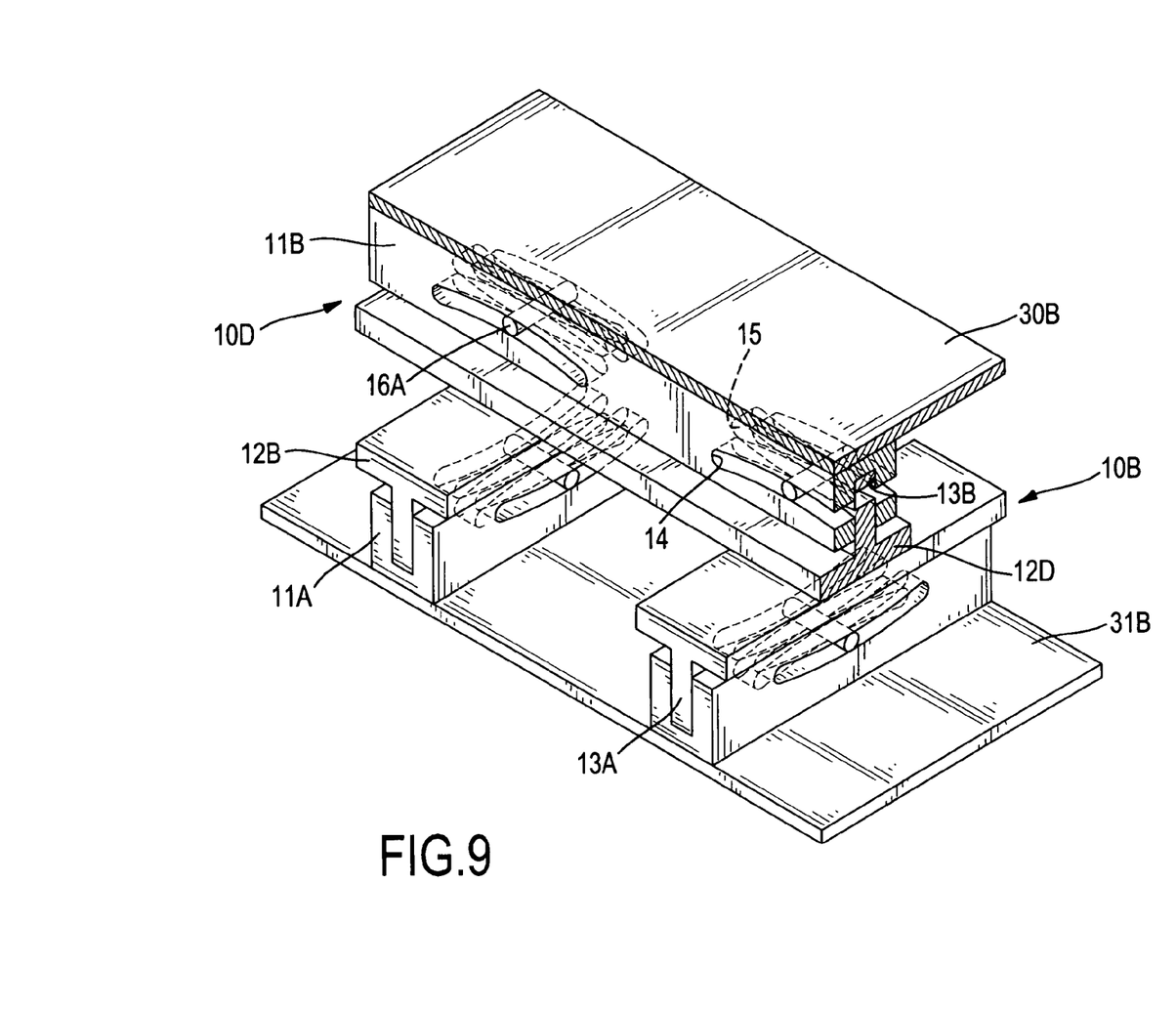
FIG. 9 is a perspective view in partial section of a ninth embodiment of the anti-shock device in accordance with this invention.

With reference to FIG. 9, the anti-shock device is similar to the eighth embodiment, wherein the modified sliding member (12C) is replaced by a modified sliding member (10D), which is orthogonally placed on the two sliding members (10A). The modified sliding member (10D) is comprised of a slotted seat (11B), an inner seat (12D) and more than one rolling shaft (16A). Two rolling shafts (16A) are applied in this ninth embodiment.

The slotted seat (11B) has a slot (13B) defined longitudinally in a top face or a bottom face, and two sets of outer curved rails (14) are defined in opposite sidewalls of the slotted seat (11B), and curve toward the opening of the slot (13B). The inner seat (12D) is T-shaped, having a protrusion in a middle that is mounted slidably in the slot (13B) of the modified sliding member (10D). A pair of inner curved rails (15) are defined in the inner seat (12D) corresponding to the outer curved rails (14) and curve in the opposite direction away from the opening of the slot (13B). A rolling shaft (16A) is mounted through each set of outer curved rails (14) and an inner curved rail (15), respectively.

The two sliding members (10A) and the modified sliding member (10D) contact each other on inner seat (12B)(12D) faces.

The top plate (30B) is mounted on the modified sliding member (10D), and the bottom plate (31B) is mounted below the two sliding members (10A).

The two sliding members (10A) and the modified sliding member (10D) can exchange positions, that is, the two sliding members (10A) are mounted above the modified sliding member (10D), and the energy dissipation member (20) can also be applied if necessary.

Figure 10:
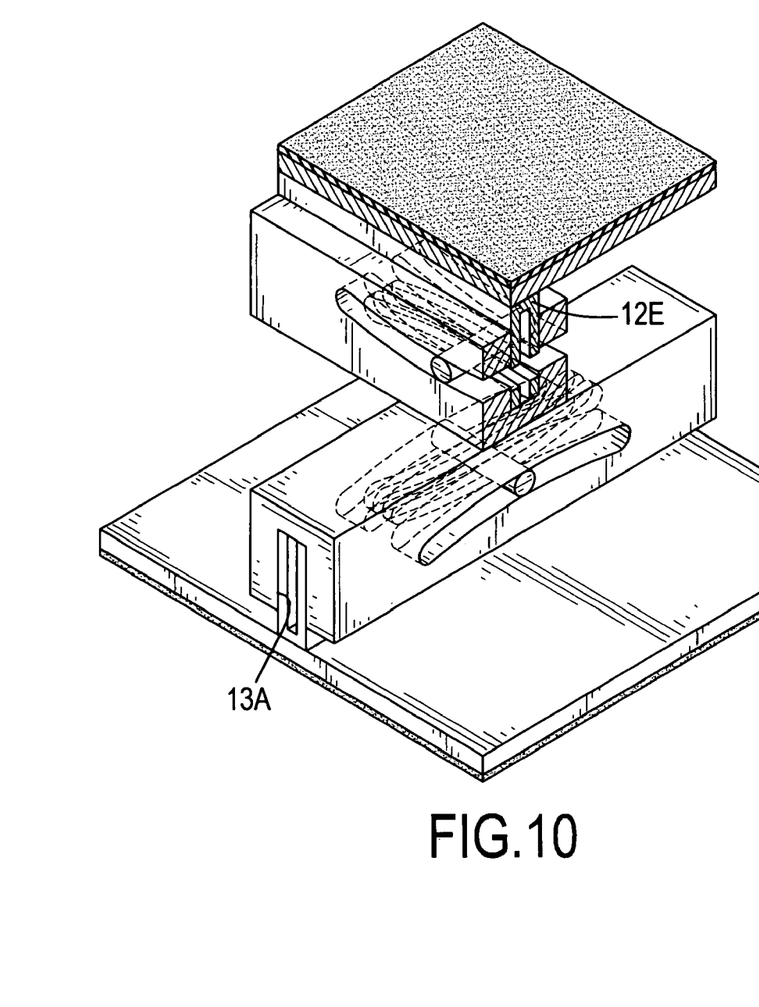
FIG. 10 is a perspective view in partial section of a tenth embodiment of the anti-shock device in accordance with this invention.

The tenth embodiment in FIG. 10 is similar to the first embodiment, only the inner seat (12E) has a channel defined therein, opening downward.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An anti-shock device comprising at least two sliding members mounted in at least two layers, each sliding member comprising a slotted seat, an inner seat, and at least one rolling shaft, wherein the slotted seat has a top face, a bottom face, a slot longitudinally defined in one of the top face and the bottom face and having an opening, at least one outer curved rail defined in a sidewall next to the slot curving toward the opening of the slot; the inner seat is mounted slidably in the slot of the slotted seat and has at least one inner curved rail defined in the inner seat corresponding to the at least one outer curved rail and curving in an opposite direction away from the opening of the slot; and each one of the at least one rolling shaft is mounted through at least one of the at least one outer curved rail and at least one of the at least one inner curved rail.

2. The anti-shock device as claimed in claim 1 comprising two sliding members, wherein one sliding member is placed above the other.

3. The anti-shock device as claimed in claim 2, wherein a top plate is mounted on an upper sliding member, and a bottom plate is mounted on a lower sliding member.

4. The anti-shock device as claimed in claim 1 comprising at least three sliding members and including a top layer and a lower layer, wherein the lower layer includes at least two lower sliding members provided in parallel with a certain distance between adjacent sliding members, and the top layer includes at least one remaining upper sliding member.

5. The anti-shock device as claimed in claim 4, wherein a top plate is mounted on the at least one upper sliding member, and a bottom plate is mounted on at least one of the lower sliding members.

6. The anti-shock device as claimed in claim 2, wherein each slotted seat has two outer curved rails defined in opposite sidewalls of the slotted seat, each inner seat is rectangular in cross section, and each rolling shaft is mounted rotatably through at least one corresponding outer curved rail and at least one corresponding inner curved rail.

7. The anti-shock device as claimed in claim 4, wherein the slotted seat of each one of the at least one upper sliding member has two outer curved rails defined in opposite sidewalls of the slotted seat, the inner seat of each one of the at least one upper sliding member is rectangular in cross section, and the rolling shaft of each one of the at least one upper sliding member is mounted in a rotatable manner; and the slotted seat of each lower sliding member has two outer curved rails defined in opposite sidewalls of the slotted seat, the inner seat of each lower sliding member is rectangular in cross section, and the rolling shaft is mounted in a rotatable manner.

8. The anti-shock device as claimed in claim 1, wherein an energy dissipation member is provided between any two of corresponding slotted seat, inner seat and rolling shaft.

9. The anti-shock device as claimed in claim 6, wherein an energy dissipation member is provided between any two of corresponding slotted seat, inner seat and rolling shaft.

10. The anti-shock device as claimed in claim 7, wherein an energy dissipation member is provided between any two of corresponding slotted seat, inner seat and rolling shaft.

11. The anti-shock device as claimed in claim 8, wherein the energy dissipation member is at least one pad that contacts at least one side of one of the slotted seats.

12. The anti-shock device as claimed in claim 9, wherein the energy dissipation member is at least one pad that contacts at least one side of one of the slotted seats.

13. The anti-shock device as claimed in claim 10, wherein the energy dissipation member is at least one pad that contacts at least one side of one of the slotted seats.

14. The anti-shock device as claimed in claim 8, wherein the dissipation member is a dampening layer covering an inner wall of one of the slots.

15. The anti-shock device as claimed in claim 9, wherein the dissipation member is a dampening layer covering an inner wall of one of the slots.

16. The anti-shock device as claimed in claim 10, wherein the dissipation member is a dampening layer covering an inner wall of one of the slots.

17. The anti-shock device as claimed in claim 8, wherein the dampening layer covers inner walls of the outer curved rails.

18. The anti-shock device as claimed in claim 9, wherein the dampening layer covers inner walls of the outer curved rails.

19. The anti-shock device as claimed in claim 10, wherein the dampening layer covers inner walls of the outer curved rails.

20. The anti-shock device as claimed in claim 8, wherein the dampening layer covers an outer surface of at least one rolling shaft.

21. The anti-shock device as claimed in claim 9, wherein the dampening layer covers an outer surface of at least one rolling shaft.

22. The anti-shock device as claimed in claim 10, wherein the dampening layer covers an outer surface of at least one rolling shaft.

23. The anti-shock device as claimed in claim 3, wherein the dampening layer covers at least one of the top plate and bottom plate.

24. The anti-shock device as claimed in claim 6, wherein the dampening layer covers at least one of the top plate and bottom plate.

25. The anti-shock device as claimed in claim 7, wherein the dampening layer covers at least one of the top plate and bottom plate.

26. The anti-shock device as claimed in claim 9, wherein the dampening layer covers at least one of the top plate and bottom plate.

27. The anti-shock device as claimed in claim 10, Wherein the dampening layer covers at least one of the top plate and bottom plate.

28. An anti-shock device has a sliding member, which comprises a slotted seat, an inner seat and at least one rolling shaft, wherein the, slotted seat has a top face, a bottom face, a slot longitudinally defined in one of the top face and the bottom face and having an opening, at least one outer curved rail defined in a sidewall next to the slot curving toward an opening of the slot; the inner seat is mounted slidably in the slot of the slotted seat and has an inner curved rail defined in the inner seat corresponding to the outer curved rail and curving in an opposite direction away from the opening of the slot; and each one of the at least one rolling shaft is mounted through at least one of the at least one outer curved rail and the inner curved rail.

* * * * *